United States Patent Office 2,934,418
Patented Apr. 26, 1960

2,934,418
COLLOIDAL POWDER AND METHOD OF PRODUCING SAME

Albert Augustin Alexandre Darche, Bondy, France, assignor to Activa Ibera, Geneva, Switzerland, a corporation No Drawing. Application May 25, 1956
Serial No. 587,202

Claims priority, application Belgium June 15, 1955

4 Claims. (Cl. 52—5)

The present invention relates to a method of manufacturing a colloidal powder and also to the product obtained by this method.

In view of reducing the wear of barrels it is generally essential, particularly in certain applications, to use a colloidal powder adapted to emit gases of considerably reduced temperature without occasionating, however, any excessive reduction in the power "force."

If $v_0$ is the gas volume, reduced to normal conditions, emitted by one kilogram of powder, and $t$ the combustion temperature in degrees C., the "force" $f$ of a powder and more generally of an explosive is proportional to $v_0$ $(t+273)$.

Thus, the volume factor $v_0$ is more important than the temperature $t$.

On the other hand, with given nitrogen contents the guncotton is brought to the colloidal form by a gelatinization effected with the assistance of an ether-alcohol mixture.

According to this invention there is dissolved beforehand in at least one portion of the ether-alcohol mixture to be utilized for gelatinizing the guncotton at least one non-nitrated compound which is thus homogeneously incorporated in a molecular or at least colloidal form in the nitrated cotton during the gelatinization thereof; the pyrogenous dissociation of this compound, which is attended by endothermic reactions during the combustion of the nitrated constituents of the powder, will release a very important volume of gas, so that as far as the "force" of the powder is concerned, there will be a compensation for the substantial reduction in temperature which results for the gaseous mixture being formed as the nitrated constituents of the powder are burned.

According to the method of this invention the following operations take place during the combustion of the powder: (1) endothermic reactions, and (2) the release of a substantial volume of gases.

The compound dissolved in the ether-alcohol mixture will therefore have a carbon content.

This carbon content is adapted to dissociate the water vapor $H_2O$ and the carbon dioxide $CO_2$ of the powder combustion gases, according to the following endothermic reactions:

$$CO_2 + C = 2CO \quad \text{kcal} \quad -39.4 \quad (1)$$
$$H_2O + C = CO + H_2 \quad \text{kcal} \quad -29.4 \quad (2)$$

Each carbon atom introduced in the powder and reacting according to one of the two above endothermic reactions 1 and 2 will determine on the one hand a substantial reduction in the temperature of the gaseous mixture developing during the powder combustion and, on the other hand the release of an extra molecular volume of gases, i.e. 1,867 litres of gas per kilogram of carbon employed.

Another means of considerably increasing the gaseous volume resulting from the pyrogenous dissociation of the compound dissolved, according to this invention, in the ether-alcohol mixture, consists in utilizing a hydrogen-containing composition.

Consequently, this will be a carbon and hydrogen composition.

The dissolved compounds may contain nitrogen and, if desired, a low proportion of oxygen.

Here are a few amongst the many compounds adapted to be utilized for carrying out the method of this invention, which are very soluble in the aforesaid ether-alcohol mixture: Durol $C_6H_2(CH_3)_4$, amarine $C_{21}H_{19}N_2$, nitrotoluene $C_{14}H_{14}N_2$, tetrahydronaphthol $OH \cdot C_6H_3 \cdot C_4H_8$, triphenyl methane $(C_6H_5)_3CH$, diethylurea CO

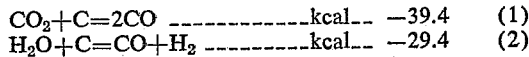

and dihydroanthracene $C_{14}H_{12}$.

The following substances may also be cited without limiting the list of compounds suitable for carrying out the invention:

Ortholidine $C_{14}H_{16}N_2$
Diphenyl $C_6H_5C_6H_5$
Diphenol op' $C_{12}H_{10}O_2$
Orthophenylenediamine $C_4H_8O_2N_2$
Dimethyloxime $C_4H_8O_2N_2$
Tetramethyldiaminobenzohydrol $C_{17}H_{22}N_2O$
Naphthoquinoline β $C_{13}H_9N$
Oxydiphenylamine $C_{12}H_{11}O$
Dimethylaminophenol $C_8H_{11}NO$
Dimethylphenylenediamine $C_8H_{12}N$
Mesitol $C_9H_{12}O$
Dianisidine $C_{14}H_{16}O_2N_2$ One kilogram of these compounds, dissolved in the ether-alcohol galatinizing mixture incorporated by this means in the guncotton, dissociated as the latter burns and reacting with the gases released during the combustion, will cause an additional gaseous volume of at least 2,300 litres to develop, this value attaining 2,840 litres in certain cases. By way of comparison, it may be noted that this gaseous volume is 872 litres for one kilogram of strong guncotton of the so-called $CP_1$ type.

By using the few compounds indicated hereinabove by way of example the method of this invention this value can be trebled.

According to this method, it is now possible to obtain: (1) either the so-called "cold" powders developing a gaseous mixture having a temperature considerably lower than the combustion temperature of conventional powders, without occasioning any appreciable reduction in the powder "force"; (2) or powders adapted to release gases at the normal combustion temperature of conventional powders, these powders being however considerably stronger than conventional powders.

According to cases and to the applications contemplated, many modifications and alterations may be brought to the invention without departing from the fundamental principles thereof.

What I claim as new is:

1. In a method of producing a colloidal powder, the steps of dissolving in a quantity of a solvent adapted for gelatinizing guncotton and sufficient to gelatinize the same, at least one substance selected from the group consisting of durol, amarine, nitrotoluene, tetrahydronaphthol, triphenyl methane, diethylurea, dihydroanthracene, ortholidine diphenyl, diphenol, orthophenylenediamine, dimethyloxime, titramethyldiaminobenzohydrol, naphthoquinoleine, oxydiphenylamine, dimethylaminophenol, dimethylphenylenediamine, mesitol and dianisidine, so as to form a solution of said substance in said solvent, one kilogram of said substance being capable of developing upon simultaneous combustion with guncotton at least about 2300 liters of gas; treating guncotton with said solution so as to gelatinize said guncotton; and converting the thus treated gelatinized guncotton into powder, thereby forming a powder which upon combustion thereof will form per kilogram of said substance contained therein at least about 2300 liters of gas.

2. In a method of producing a colloidal powder, the steps of dissolving in a quantity of an ether-alcohol mixture as a solvent adapted for gelatinizing guncotton and sufficient to gelatinize the same, at least one substance selected from the group consisting of durol, amarine, nitrotoluene, tetrahydronaphthol, triphenyl methane, diethylurea, dihydroanthracene, ortholidine, diphenyl, diphenol, orthophenylenediamine, dimethyloxime, tetramethyl-diaminobenzohydrol, naphthoquinoleine, oxydiphenylamine, dimethylaminophenol, dimethylphenylenediamine, mesitol and dianisidine, so as to form a solution of said substance in said ether-alcohol mixture, one kilogram of said substance being capable of developing upon simultaneous combustion with guncotton between about 2300 and 2840 liters of gas; treating guncotton with said solution so as to gelatinize said guncotton; and converting the thus treated gelatinized guncotton into powder, thereby forming a powder which upon combustion thereof will form per kilogram of said substance contained therein between about 2300 and 2840 liters of gas.

3. As a new composition of matter a colloidal powder consisting essentially nitrated cotton having incorporated therein at least one substance selected from the group consisting of durol, amarine, nitrotoluene, tetrahydronaphthol, triphenyl methane, diethylurea, dihydroanthracene, ortholidine, diphenyl, diphenol, orthophenylenediamine, dimethyloxime, tetramethyldiaminobenzohydrol, naphthoquinoleine, oxydiphenylamine, dimethylaminophenol, dimethylphenylenediamine, mesitol and dianisidine, said substance being capable of developing upon simultaneous combustion with guncotton between about 2300 and 2840 liters of gas per kilogram of said substance contained in said powder.

4. In a method for producing a colloidal explosive powder by gelatinization of guncotton by means of a liquid consisting of alcohol and ether in the proportions of two parts of ether for each part of alcohol, the steps of contacting said guncotton with at least a portion of the alcohol of said liquid so as to dehydrate said cotton; dissolving in the remainder of said liquid at least one substance selected from the group consisting of durol, amarine, nitrotoluene, tetrahydronaphthol, triphenyl methane, diethylurea, dihydroanthracene, ortholidine, diphenyl, diphenol, orthophenylenediamine, dimethyloxime, tetramethyldiminobenzohydrol, naphthoquinoleine, oxydiphenylamine, dimethylaminophenol, dimethylphenylenediamine, mesitol and dianisidine, so as to form a solution of said substance in said remainder of said liquid, one kilogram of said substance being capable of releasing upon simultaneous combustion with guncotton at least about 2300 liters of gas; treating said dehydrated guncotton with the thus-formed solution so as to gelatinize said guncotton and to homogeneously distribute therethrough said dissolved substance; and converting said gelatinized guncotton having said substance distributed therethrough, into powder, thereby forming a powder which upon combustion thereof will form per kilogram of said substance contained therein at least about 2300 liters of gas.

References Cited in the file of this patent

UNITED STATES PATENTS

| | | |
|---|---|---|
| 1,978,071 | York | Oct. 23, 1934 |
| 2,230,100 | Aaron et al. | Jan. 28, 1941 |
| 2,355,269 | Cairns | Aug. 8, 1944 |

FOREIGN PATENTS

| | | |
|---|---|---|
| 22,095 | Great Britain | 1909 |